US007411967B2

(12) United States Patent
Thubert et al.

(10) Patent No.: US 7,411,967 B2
(45) Date of Patent: Aug. 12, 2008

(54) PRIVATE NETWORK GATEWAYS INTERCONNECTING PRIVATE NETWORKS VIA AN ACCESS NETWORK

(75) Inventors: Pascal Thubert, La Colle sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 11/123,101

(22) Filed: May 6, 2005

(65) Prior Publication Data
US 2006/0251088 A1    Nov. 9, 2006

(51) Int. Cl.
*H04L 12/28* (2006.01)
(52) U.S. Cl. .................... 370/401; 370/466; 370/352
(58) Field of Classification Search .................. None
See application file for complete search history.

(56) References Cited

U.S. PATENT DOCUMENTS

| 7,162,529 | B2 * | 1/2007 | Morishige et al. ........... 709/230 |
|---|---|---|---|
| 2004/0103212 | A1 | 5/2004 | Takeuchi et al. |
| 2004/0179508 | A1 | 9/2004 | Thubert et al. |
| 2004/0179532 | A1 | 9/2004 | Thubert et al. |
| 2004/0179536 | A1 | 9/2004 | Thubert et al. |
| 2004/0190549 | A1 | 9/2004 | Huitema |
| 2004/0233916 | A1 | 11/2004 | Takeuchi et al. |
| 2004/0240468 | A1 | 12/2004 | Chin et al. |

| 2005/0089025 | A1 | 4/2005 | Boyer et al. |
|---|---|---|---|
| 2005/0169249 | A1 * | 8/2005 | Shirota et al. ................ 370/352 |

OTHER PUBLICATIONS

U.S. Appl. No. 10/875,811, filed Jun. 25, 2004, Wetterwald et al.
U.S. Appl. No. 11/100,400, filed Apr. 7, 2005, Wetterwald et al.
Carugi et al, "Service Requirements for Layer 3 Virtual Private Networks", Internet Engineering Task Force, Internet Draft draft-ietf-l3vpn-requirements-02.txt, Jul. 2004.
Rekhter et al, "Address Allocation for Private Internets", Network Working Group, Request for Comments: 1918, Feb. 1996.

(Continued)

*Primary Examiner*—Duc C Ho
(74) *Attorney, Agent, or Firm*—Leon R. Turkevich

(57) ABSTRACT

Gateways providing connectivity for respective private IPv4 networks to an IPv6 network establish communications between IPv4 nodes in the private network. Network address translation-protocol translation (NAT-PT) state entries are created by gateway pairs enabling translation of IPv4 packets between first and second IPv4 nodes in respective first and second IPv4 private networks into IPv6 packets for transmission via the IPv6 network. Each NAT-PT state entry specifies the IPv6 addresses for the first and second IPv4 nodes, and the IPv4 addresses used to identify the first and second IPv4 nodes in the corresponding private IPv4 network. Each gateway is configured for generating the IPv6 address for each local IPv4 node based on prepending its corresponding assigned private IPv4 address with a corresponding prescribed IPv6 prefix assigned to the gateway. Hence, gateways can dynamically establish communications between private networks without tunneling protocols, enabling deployment of latency-sensitive applications such as Voice over IP.

34 Claims, 8 Drawing Sheets

OTHER PUBLICATIONS

Deering et al., "Internet Protocol, Version 6 (IPv6) Specification", Network Working Group, Request for Comments: 2460, Dec. 1998.

Rosen et al., "BGP/MPLS VPNs", Network Working Group, Request for Comments: 2547, Mar. 1999.

Tsirtsis et al., "Network Address Translation—Protocol Translation (NAT-PT)", Network Working Group, Request for Comments: 2766, Feb. 2000.

Carpenter et al., "Connection of IPv6 Domains via IPv4 Clouds", Network Working Group, Request for Comments: 3056, Feb. 2001.

Hinden et al., "Internet Protocol Verion 6 (IPv6) Addressing Architecture", Network Working Group, Request for Comments: 3513, Apr. 2003.

Troan et al., "IPv6 Prefix Options for Dynamic Host Configuration Protocol (DHCP) version 6", Network Working Group, Request for Comments: 3633, Dec. 2003.

Nagarajan, "Generic Requirements for Provider Provisional Virtual Private Networks (PPVPN)", Network Working Group, Request for Comments: 3809, Jun. 2004.

Andersson et al., "Provider Provisioned Virtual Private Network (VPN) Terminology", Network Working Group, Request for Comments: 4026, Mar. 2005.

* cited by examiner

PRIVATE NETWORK GATEWAYS INTERCONNECTING PRIVATE NETWORKS VIA AN ACCESS NETWORK

BACKGROUND OF THE INVENTION

1. Field of the Invention

The present invention relates to interoperability between IPv4 nodes via IPv6 networks. In particular, the present invention relates to enabling a first IPv4 node of a first private network to connect with a second IPv4 node of a second private network, via an IPv6 access network, without the necessity of tunneling between the first and second private networks.

2. Description of the Related Art

Virtual private networks (VPNs) have become an increasingly popular technique for enabling host computers to remotely access a corporate network in a secure manner. VPN connections enable users of the host computers to enjoy advantages such as telecommuting, reducing the reliance of corporate network access using an on-site host computer. Efforts are underway by the Layer 3 Virtual Private Networks (l3vpn) Working Group to provide solutions for supporting provider-provisioned Layer-3 (routed) Virtual Private Networks (L3VPNs).

Conventional VPNs have relied on connections via the Internet, implemented as a public IPv4 network. However, such reliance introduces numerous well known performance issues, including bandwidth and latency limitations, and potential exposure to unreliable and malicious entities, especially in cases where queries need to be sent (e.g., Domain Name Service (DNS) queries) need to be sent to locate a destination VPN server providing the VPN service.

Additional problems arise in cases where a VPN connection is attempted via an access network, for example in the cases where an IPv4 host computer in a private network attempts to access a destination via an IPv6 access network. Proposals are underway by the Next Generation Transition (NGTRANS) Working Group of the Internet Engineering Task Force (IETF), renamed as the IPv6 Operations (v6ops) Working Group, to enable network nodes to transmit IP packets, generated according to IPv6 protocol as specified by the Request for Comments (RFC) 2460, across an IPv4 network. For example, RFC 3056 proposes an interim solution (referred to herein as "the 6 to 4 proposal") of sending IPv6 packets as payload for IPv4 packets, where an interim unique IPv6 address prefix is assigned to any node that has at least one globally unique IPv4 address. The 6 to 4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address.

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6 to 4 mechanism" in order for the 6 to 4 proposal to still be operable in the IPv4 network having the NAT. However, the modification of existing NATs to include IPv6 routers to include the 6 to 4 mechanism may not be a practical solution.

Further, the IPv4 addresses of the 6 to 4 protocol are assumed to be global public addresses. Hence, if an IPv6 node (i.e., a correspondent node) wants to communicate with a roaming mobile IPv6 node, the 6 to 4 address of the roaming mobile IPv6 node must be a global public address, not a private address.

Another NAT-based proposal for enabling IPv4 hosts in an IPv4 network to access IPv6 hosts in an IPv6 network is described in RFC 2766, entitled "Network Address Translation—Protocol Translation (NAT-PT). The NAT-PT provides a combination of network address translation and protocol translation based on a pool of IPv4 addresses for assignment to IPv6 nodes on a dynamic basis as sessions are initiated across IPv4-IPv6 boundaries. However, the description of the NAT-PT in the RFC 2766 assumes that IPv4 addresses are unique.

Commonly-assigned, copending application Ser. No. 10/875,811, filed Jun. 25, 2004, entitled "ARRANGEMENT FOR REACHING IPv4 PUBLIC NETWORK NODES BY A NODE IN AN IPv4 PRIVATE NETWORK VIA AN IPv6 ACCESS NETWORK," the disclosure of which is incorporated in its entirety herein by reference, describes an arrangement that enables an IPv4 node to access an IPv4 public network via an IPv6 access network. The IPv4 node is able to send an IPv4 packet to an IPv4 destination via the IPv6 access network, based on translation of the IPv4 packet into an IPv6 packet for transmission via the IPv6 access network. The IPv4 packet is translated into the IPv6 packet by a local gateway. The IPv6 packet has an IPv6 source address that includes a prescribed address prefix assigned to the local gateway, and an IPv4 address of the IPv4 node. The IPv6 packet also includes an IPv6 destination address that includes a second address prefix assigned to a remote gateway, and a second IPv4 address of the IPv4 destination. The IPv6 packet is converted by the remote gateway into an IPv4 packet for reception by the IPv4 destination via an IPv4 network. Hence, the IPv4 node is able to communicate with an IPv4 destination residing on another IPv4 network via the IPv6 access network, without the necessity of generating an IPv6 tunnel between the local gateway and the remote gateway.

SUMMARY OF THE INVENTION

As the use of IP-based private networks becomes more prevalent (e.g., in residences, vehicles, etc.), it becomes highly desirable to provide a mechanism that enables host computers within the private networks to interconnect without the necessity of VPN-based technology.

Hence, there is a need for an arrangement that enables host computers in distinct private networks to interconnect without the necessity of relying on public network access, eliminating the necessity of VPN-based interconnection between the host computers.

There also is a need for an arrangement that enables host computers in distinct private networks to establish peer-based interconnections via a shared access network, without the necessity of advertisement on a public network.

There also is a need for an arrangement that enables host computers in distinct private networks to establish peer-based interconnections via a shared access network with minimal encapsulation requirements, enabling optimized communications for latency-sensitive network applications (e.g. Voice over IP).

These and other needs are attained by the present invention, where first and second gateways providing connectivity for respective first and second private IPv4 networks to an IPv6 network are configured for establishing communications between a first IPv4 node in the first private network, and a second IPv4 node in the second private network. The first and second gateways create network address translation-protocol translation (NAT-PT) state entries enabling translation of IPv4 packets between the first and second IPv4 nodes into IPv6 packets for transmission via the IPv6 network. Each NAT-PT state entry specifies the IPv6 addresses for the first and second IPv4 nodes, and the IPv4 addresses used to identify the first and second IPv4 nodes in the corresponding private IPv4 network. Each gateway is configured for generating the IPv6 address for each local IPv4 node based on prepending its corresponding assigned private IPv4 address with a corresponding prescribed IPv6 prefix assigned to the gateway. The IPv6 addresses for remote IPv4 nodes can be obtained based on sending a query to a locator resource in the IPv6 network. Each gateway also is configured for dynamically generating a unique private IPv4 address for identifying the remote IPv4 node within the connected private IPv4 network based on a determined conflict between the private IPv4 address assigned to the remote IPv4 node by its remote IPv4 network, and an assigned IPv4 address. Hence, gateways can dynamically establish communications between IPv4 nodes in private networks across an IPv6 network without the necessity of tunneling protocols, enabling deployment of latency-sensitive applications such as Voice over IP across private networks.

One aspect of the present invention provides a method in a gateway coupled to a first private IPv4 network and an IPv6 network. The method includes receiving a first IPv4 packet from a first IPv4 node in the first private IPv4 network. The first IPv4 packet has a source address field specifying a first private IPv4 address having been dynamically assigned to the first IPv4 node, and a request for initiating a communication with a second IPv4 node identified in the request and outside the first private IPv4 network. The method also includes sending the request into the IPv6 network for locating the second IPv4 node, including creating a first IPv6 address for the first IPv4 node based on prepending the first private IPv4 address with a prescribed IPv6 prefix assigned to the gateway. A response is obtained from the IPv6 network that specifies the first IPv6 address, and a second IPv6 address for reaching the second IPv4 node identified in the request via the IPv6 network, and a network address translation-protocol translation (NAT-PT) state entry is created for enabling communication between the first IPv4 node and the second IPv4 node. The NAT-PT state entry specifies the first private IPv4 address for identifying the first IPv4 node in the first private IPv4 network, the first IPv6 address for identifying the first IPv4 node via the IPv6 network, the second IPv6 address for identifying the second IPv4 node via the IPv6 network, and a determined unique private IPv4 address for identifying the second IPv4 node within the first private IPv4 network. The method also includes establishing communications between the first IPv4 node and the second IPv4 node via the first private IPv4 network and the IPv6 network, based on translation of the first private IPv4 address and the unique private IPv4 address specified in a data packet received from the first IPv4 node, into the respective first IPv6 address and the second IPv6 address for transmission of the data packet to the second IPv4 node via the IPv6 network as an IPv6 packet.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
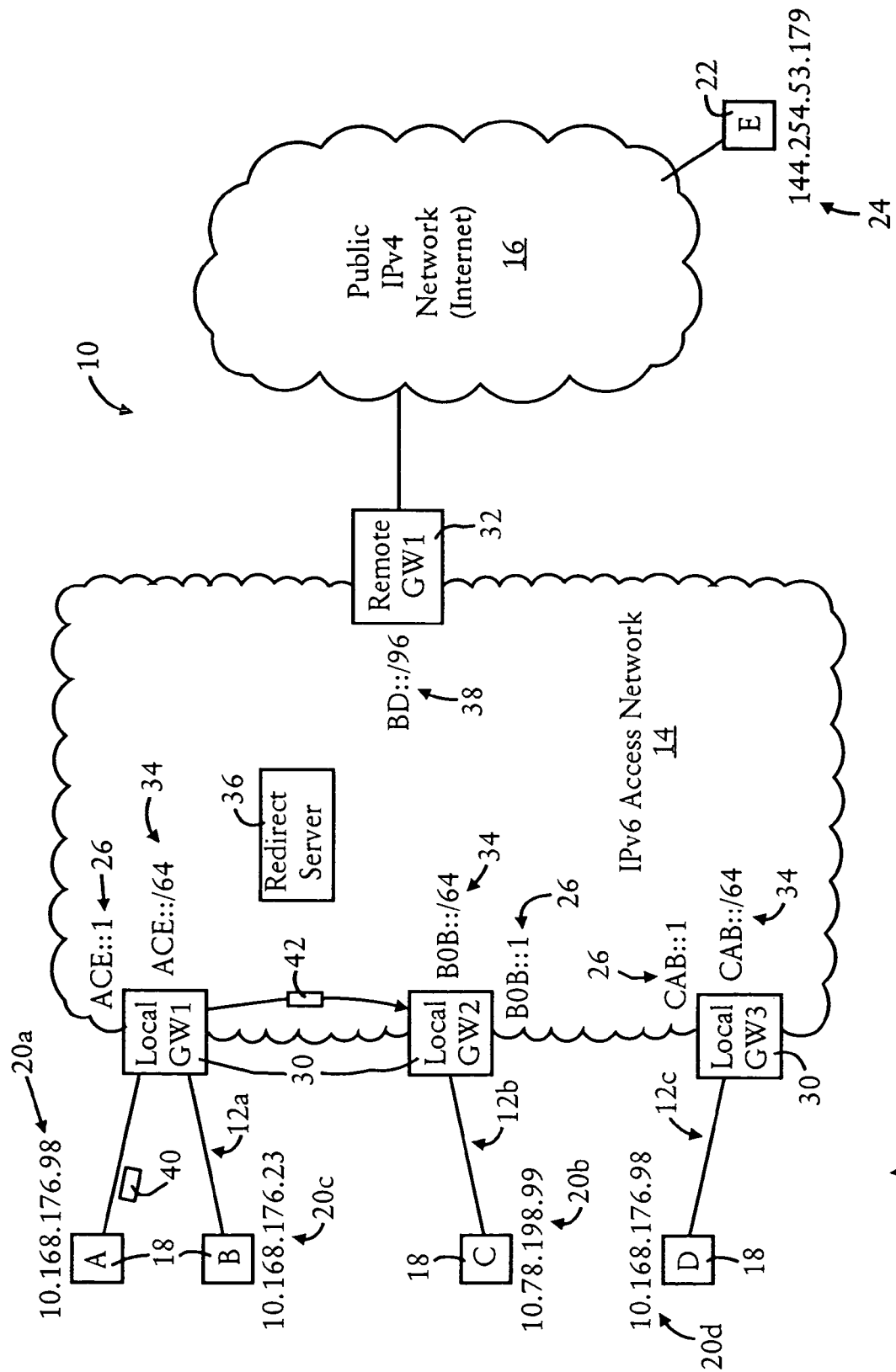
FIG. 1 is a diagram illustrating an internetworking system including an IPv6 access network and multiple gateways for interconnecting IPv4 hosts in respective IPv4 private networks, according to an embodiment of the present invention.

FIG. 1 is a diagram illustrating an internetworking system 10 including private IPv4 networks 12 (e.g., 12a, 12b, 12c) at respective subscriber premises, an IPv6 access network 14, and a public IPv4 network 16, according to an embodiment of the present invention. Each private IPv4 network 12 is "private" in that each network node 18 within a corresponding private IPv4 network 12 uses a prescribed private address 20 (e.g., "10.168.176.98") as specified by the RFC 1918, entitled "Address Allocation for Private Internets". In contrast, the public IPv4 network 16 is "public" in that each network node 22 must use a valid, globally-unique IPv4 address 24 (e.g., "144.254.53.179"), as described in the RFC 1918. An example of the public IPv4 network 16 is the Internet.

The private IPv4 address 20 is assigned to a local IPv4 node 20 in the private IPv4 network 12 preferably by the local gateway 30 according to DHCP protocol. As described below, the disclosed embodiment preferably uses 24-bit block private addresses composed of an 8-bit prefix, described in RFC 1918 as having the address expression "10.0.0.0" using a bit mask of "10.255.255.255" (10/8 prefix), in order to provide the largest possible address space for random selection of dynamically assigned addresses.

The disclosed embodiment expands on the description of the above-incorporated 10/875,811, which enabled a private IPv4 network 12 at a customer premises to access a wide-area IPv4 network 16 such as the Internet, using an IPv6 network 14 as an access network. As described below, the disclosed embodiment utilizes gateways 30 that store translation state information in order to enable IPv4 hosts 18 within different private networks 12 establish communications sessions, without the necessity of tunneling operations.

Each private network 12 is connected to a corresponding local gateway 30, deployed at the corresponding customer premises and that interfaces between the corresponding private network 12, and the IPv6 access network 14. Each local gateway 30 interfaces with the IPv6 access network 14 using an assigned IPv6 address prefix 34: as illustrated in FIG. 1, the gateways "GW1", "GW2" and "GW3" 30 are assigned the address prefixes "ACE::/64", "BOB::/64", and "CAB::/64" 34, respectively, and are reachable within the IPv6 network 14 by respective IPv6 addresses "ACE::1", "BOB::1", and "CAB::1" within the respective address prefix space. The assigned IPv6 address prefix 34 for the corresponding local gateway 30 may be assigned to the local gateway 30 either statically (e.g., based on programming of a nonvolatile register), or preferably dynamically, for example by an access router in the IPv6 access network 14 (not shown) using Dynamic Host Configuration Protocol (DHCPv6) according to RFC 3633.

Each gateway 30 also is reachable within its corresponding private network 12 by a prescribed private IPv4 address (e.g., "10.0.0.0"). Hence, the local gateway 30 is "part of" the IPv6 network 14 and its corresponding private IPv4 network in that it has connections to each network. The IPv4 and IPv6 addressing disclosed herein is in accordance with RFC 1918, and RFC 3513, entitled "Internet Protocol Version 6 (IPv6) Addressing Architecture."

Each local gateway 30 is configured for translating a received IPv4 packet 40 from a local IPv4 host 18, for example host "A" having the private IPv4 address "10.168.176.98" 20, to an IPv6 packet 42. In particular, the local gateway 30 is configured for translating the IPv4 packet 40, received from the IPv4 node 18 in the private IPv4 network 12, into an IPv6 packet 42 for transfer via the IPv6 access network 14 to a destination based on IPv6 routing protocol. An example of a gateway configured for assigning a private IPv4 network address 20, and which can be configured to perform the gateway operations disclosed herein, is a commercially-available Linksys® router from Cisco Systems, Inc., available at the website address "www.linksys.com", that has been modified to execute the functions disclosed herein.

The IPv6 access network 14 includes at least one remote gateway 32 that interfaces between the IPv6 network 14 and the public IPv4 network 16. As illustrated in FIG. 1, the IPv6 access network also includes a directory service (e.g., a domain name server or redirect server) 36 that enables each local gateway 30 to locate a remote IPv4 host 18, or a remote gateway 32 for accessing the public IPv4 network 16.

Figure 6:
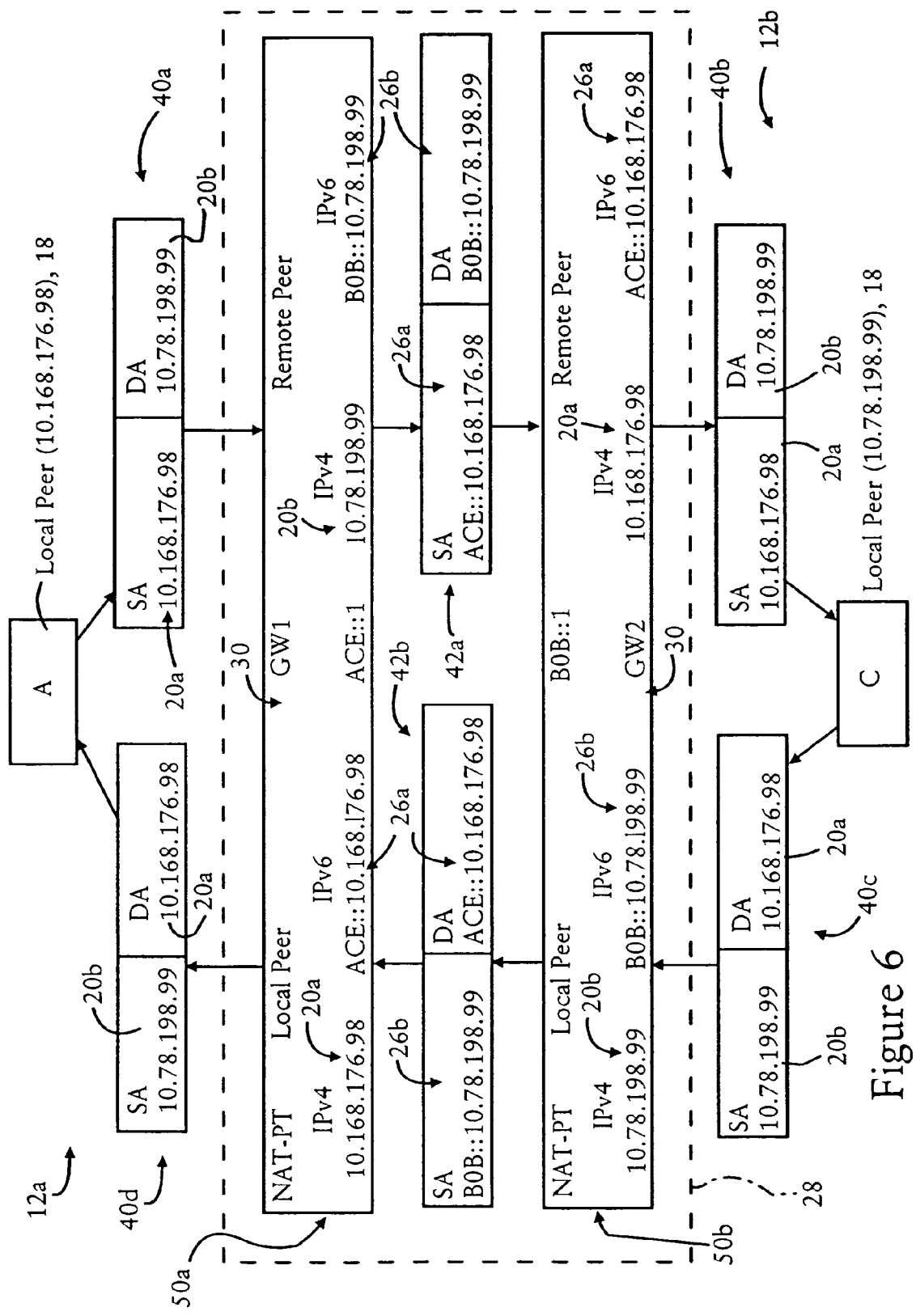
FIG. 6 is a diagram illustrating the translation of packets between peer gateways resulting in formation of a "virtual switch" for the packets between the IPv4 hosts, according to an embodiment of the present invention.

As illustrated in FIG. 6 and described in further detail below, each gateway 30 (e.g., "GW1" and "GW2") is configured for creating a network address translation-protocol translation (NAT-PT) state entry (e.g., 50*a*, 50*b*) enabling communications between IPv4 hosts 18 (e.g., "A" and "C") in separate private IPv4 networks 12 (e.g., 12*a* and 12*b*) via the IPv6 network 14 based on translation of IPv4 packets 40*a* and 40*c* into respective IPv6 packets 42*a* and 42*b* at the source gateway 30, followed by translation of the IPv6 packets 42*a* and 42*b* at the destination gateway 30 into IPv4 packets 40*b* and 40*d*, respectively. Each gateway 30 generates an IPv6 address 26 for identifying a local IPv4 host 18 via the IPv6 network 14 based on prepending the IPv4 address 20 of the host node 18 with a prescribed prefix (e.g., "ACE::/96") within the address range of the prescribed IPv6 prefix 34 assigned to the corresponding gateway 30 (e.g., "ACE::/64"). For example, the gateway "GW1" 30 generates an IPv6 address ("ACE::10.168.176.98") 26*a* for the local IPv4 host ("A") 18 by prepending the IPv4 address of the IPv4 node (e.g., "10.168.187.98") 20*a* with the assigned IPv6 prefix ("ACE::/96") 34; the gateway "GW2" 30 generates an IPv6 address ("BOB::10.78.198.99") 26*b* for the local IPv4 host ("C") 18 by prepending the IPv4 address of the IPv4 node (e.g., "10.78.198.99") 20*a* with the IPv6 prefix ("BOB::/96").

Moreover, each gateway 30 (e.g., "GW1") stores in the NAT-PT state entry the translation information for the remote IPv4 host (e.g., "C"), namely the IPv6 address used to identify the remote host via the IPv6 network 14 (e.g., "BOB::10.78.198.99"), and a determined unique private IPv4 address (e.g., "10.78.198.99") for identifying the remote host in the local private network 12 (e.g., 12*a*). As described below, the determined unique private IPv4 address may differ from the IPv4 address used by the remote host in its native private network if a conflict is detected (i.e., the IPv4 had this is already in use in the local private network).

Hence, a pair of gateways ("GW1" and "GW2") 30 may effectively form a "virtual switch" 28 between two IPv4 hosts 18 in separate private IPv4 networks 12*a* and 12*b*, based on common NAT-PT state information 50*a*, 50*b* stored in the peer gateways 30.

Figure 2:
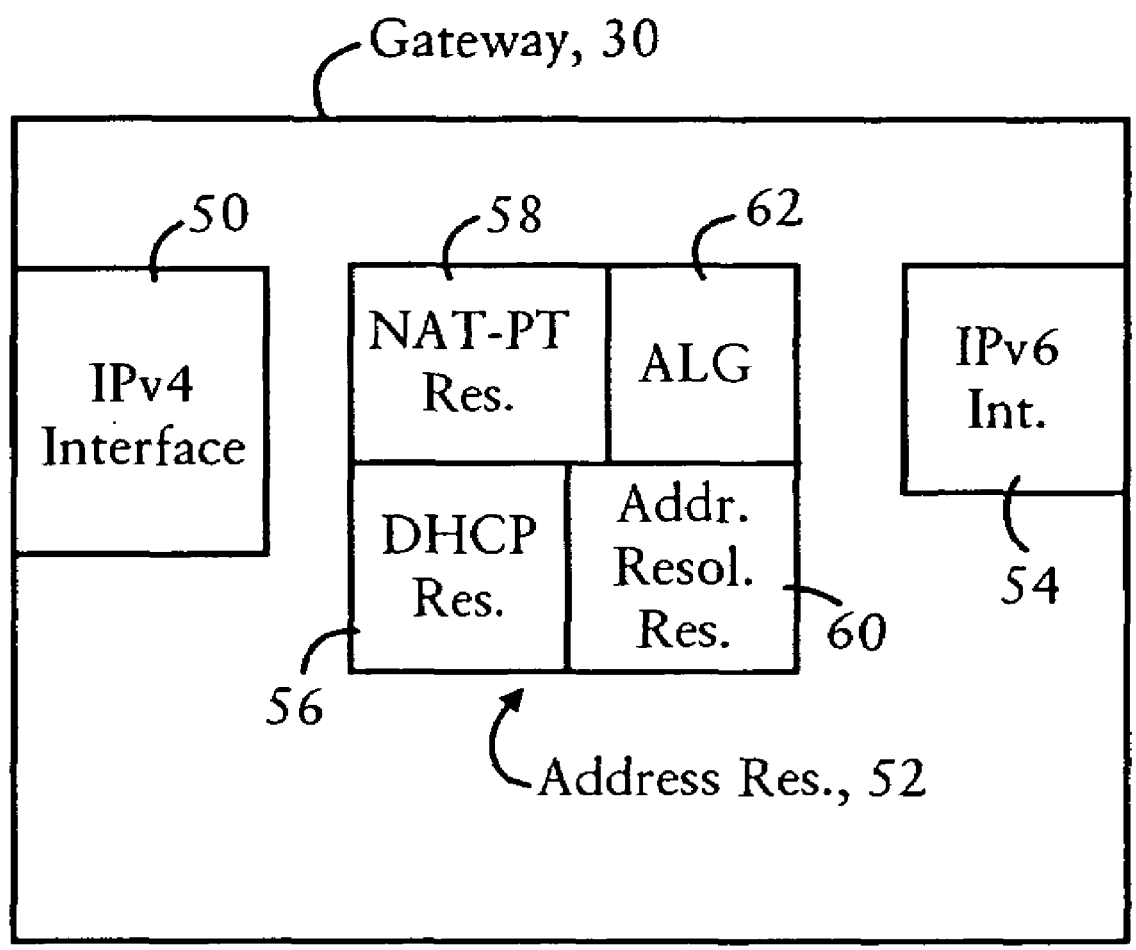
FIG. 2 is a diagram illustrating in further detail one of the gateways of FIG. 1, according to an embodiment of the present invention.

FIG. 2 is a diagram illustrating in further detail one of the local gateways 30 of FIG. 1, according to an embodiment of the present invention.

The local gateway 30 includes an IPv4 interface 50 configured for sending and receiving IPv4 packets 40 using private addresses 20, an address resource 52, and an IPv6 interface 54 for sending and receiving IPv6 packets onto and from the IPv6 access network using IPv6 addresses 26.

The address resource 52 is configured for performing all address-based operations for the local IPv4 hosts 18, including IPv4 private address assignment, translation between IPv4 private addresses and IPv6 addresses, and address resolution operations. In particular, the address resource 52 includes a DHCP resource 56, a NAT-PT resource 58, an address resolution resource 60, and an application level gateway (ALG) 62.

The DHCP resource 56 is configured for dynamically assigning each IPv4 node 18 in the corresponding private network 12 with a corresponding private IPv4 address 20, based on random selection of each private IPv4 address 20 from within a prescribed private address space, preferably the 24-bit address range permitted within the address range of "10.x.x.x". As described below, use of random selection for the private IPv4 addresses 20 minimizes the probability of any conflict between IPv4 addresses from different private networks 12. Regardless, the DHCP resource 56 also is configured for dynamically assigning a local IPv4 address for a remote IPv4 host in response to a determined conflict by the NAT-PT resource 58 between an IPv4 address assigned to the remote host by its gateway and another private IPv4 address within the local private network 12.

Figure 3:
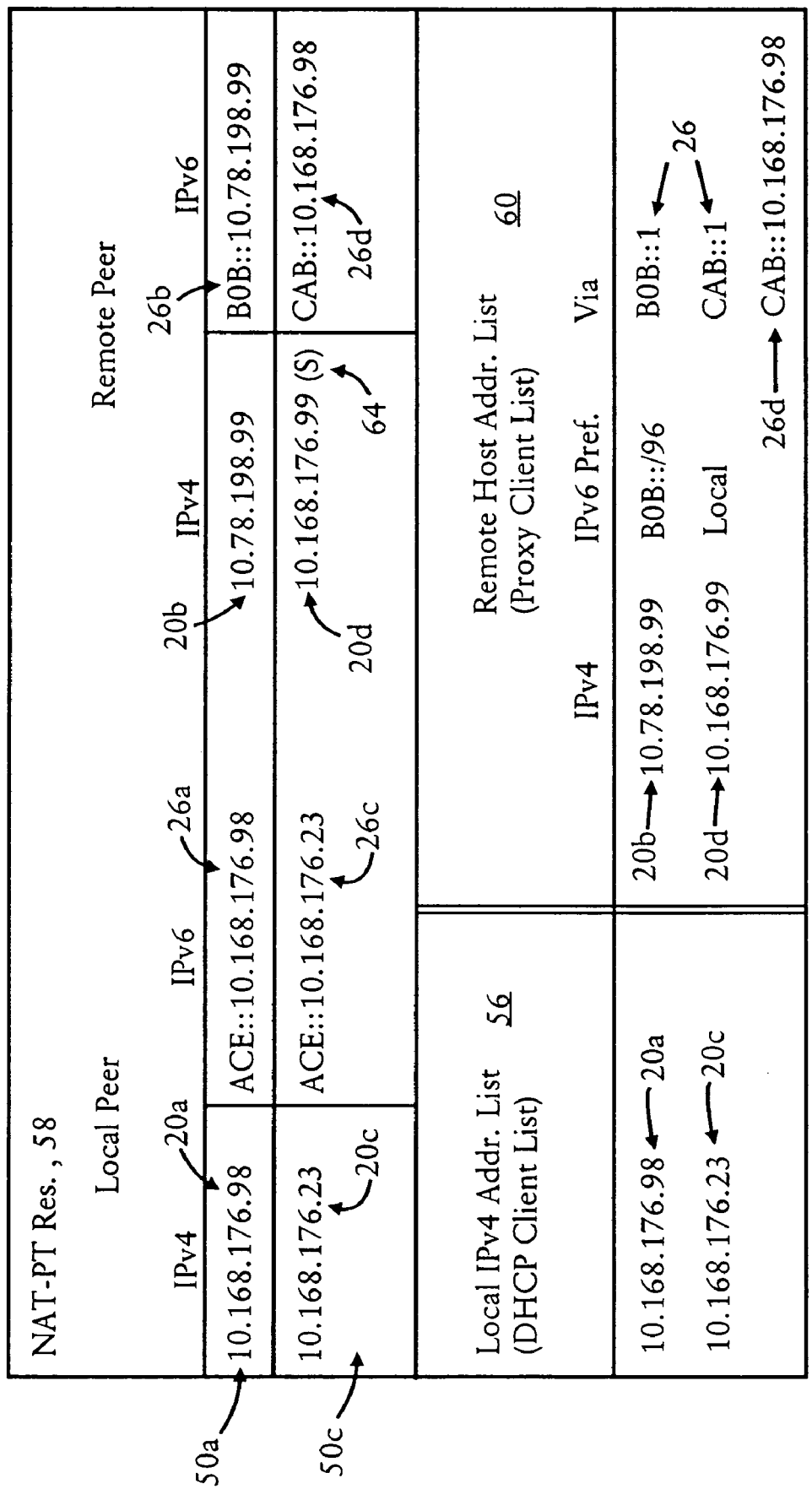
FIG. 3 is a diagram illustrating in further detail the address resource of FIG. 2, according to an embodiment of the present invention.

The NAT-PT resource 58 is configured for creating NAT-PT entries 50, illustrated in FIGS. 3 and 6, that upon completion of building the NAT-PT state will specify the private IPv4 address 20 in the IPv6 address 26 of both the local IPv4 host (e.g., "A") and the remote IPv4 host (e.g., "C") for a given communications session. As described in detail below, storing the IPv4 and IPv6 address pairs for both the local and remote IPv4 hosts enables dynamic setup and teardown of communications sessions between the IPv4 hosts, without the necessity of tunneling via the IPv6 network 14. Since the remote gateway 30 also will create a corresponding NAT-PT entry 50, the translations by the peer gateways effectively form a virtual switch 28 within the IPv6 access network 14, transparent to the IPv4 endpoint devices 18.

The address resource 52 also includes an address resolution resource 60, also referred to as a registration for discovery resource, configured for performing address resolution protocol (ARP) queries and address resolutions, for example Voice over IP based host name queries and resolutions with the redirect server 36. As described below with respect to FIGS. 4 and 5, each of the IPv4 hosts 18 may register with the redirect server 36 via the corresponding gateway 30, enabling remote IPv4 hosts 18 to locate the presence of a registered IPv4 host. As recognized in the art, the redirect server 36 may be implemented according to various name resolution protocols, for example a DNS server, a Session Initiation Protocol (SIP) redirect server implemented according to SIP RFC 2361, etc. Hence, the address resolution resource 60 acts as a proxy for performing various address resolution queries according to various protocols, for example SIP-based Voice over IP, HTTP, etc.

The application level gateway 62 is configured for translating between private IPv4 addresses 20 and IPv6 addresses 26 within the payload of an IPv4 or IPv6 packet, namely any IPv4 addresses that are specified by application layers within the payload following the IP headers. Hence, the application level gateway 62 ensures that any IP addresses that are used by the endpoint devices, for example during Voice over IP communications, are accurately translated consistent with the translations performed by the NAT-PT resource 58.

FIG. 3 is a diagram illustrating in further detail the translation resource 58, the DHCP resource 56, and the address resolution resource 60, according to an embodiment of the present invention. The translation resource 58 illustrates that two NAT-PT state entries 50a and 50c are stored for the local nodes "A" and "B" 18, respectively. In particular, the NAT-PT state entry 50a indicates that the local node "A" has an ongoing communications session with the remote node "C", described in further detail below with respect to FIGS. 4 and 5. The NAT-PT state entry 50c indicates that the local node "B" has a communications session with a remote node having the IPv6 address "CAB::10.168.176.88" 26d and the local unique private IPv4 address "10.168.176.99" 20d indicated as a locally assigned IPv4 address by the flag "S" 64.

As illustrated in FIG. 1, the IPv4 host "D" of the private network 12c has an assigned IPv4 address 20d that conflicts with the assigned IPv4 address 20a in the private IPv4 network 12a. Hence, in response to the translation resource 58 detecting the conflict with the local address 20a, the DHCP resource 56 assigns the unique private IPv4 address 20d for use in identifying the remote host "D" 18 for communications within the local private IPv4 network 12a; as illustrated in the proxy client list in the address resolution resource 60, the address resource 52 is able to monitor that the unique address is locally assigned.

Hence, address reassignment may be performed to ensure that the IPv4 address portion within a received IPv6 address 26d does not create any conflict with existing IPv4 addresses 20 having been assigned by the local DHCP resource 56.

Figure 4A:
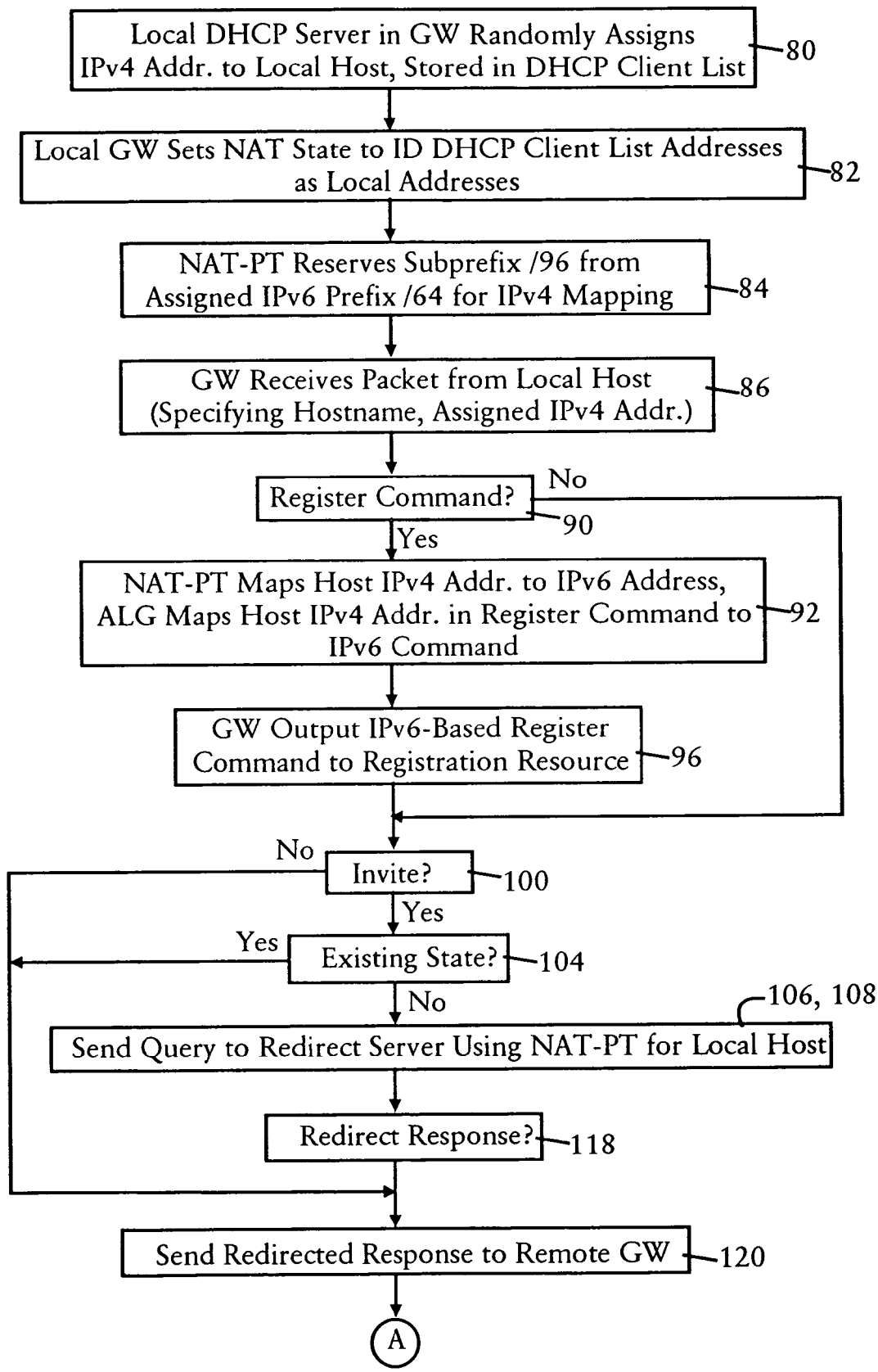
FIGS. 4A and 4B are diagrams summarizing the method of establishing communications between IPv4 hosts of distinct private networks by the gateways of FIG. 1, according to an embodiment of the present invention.
Figure 4B:
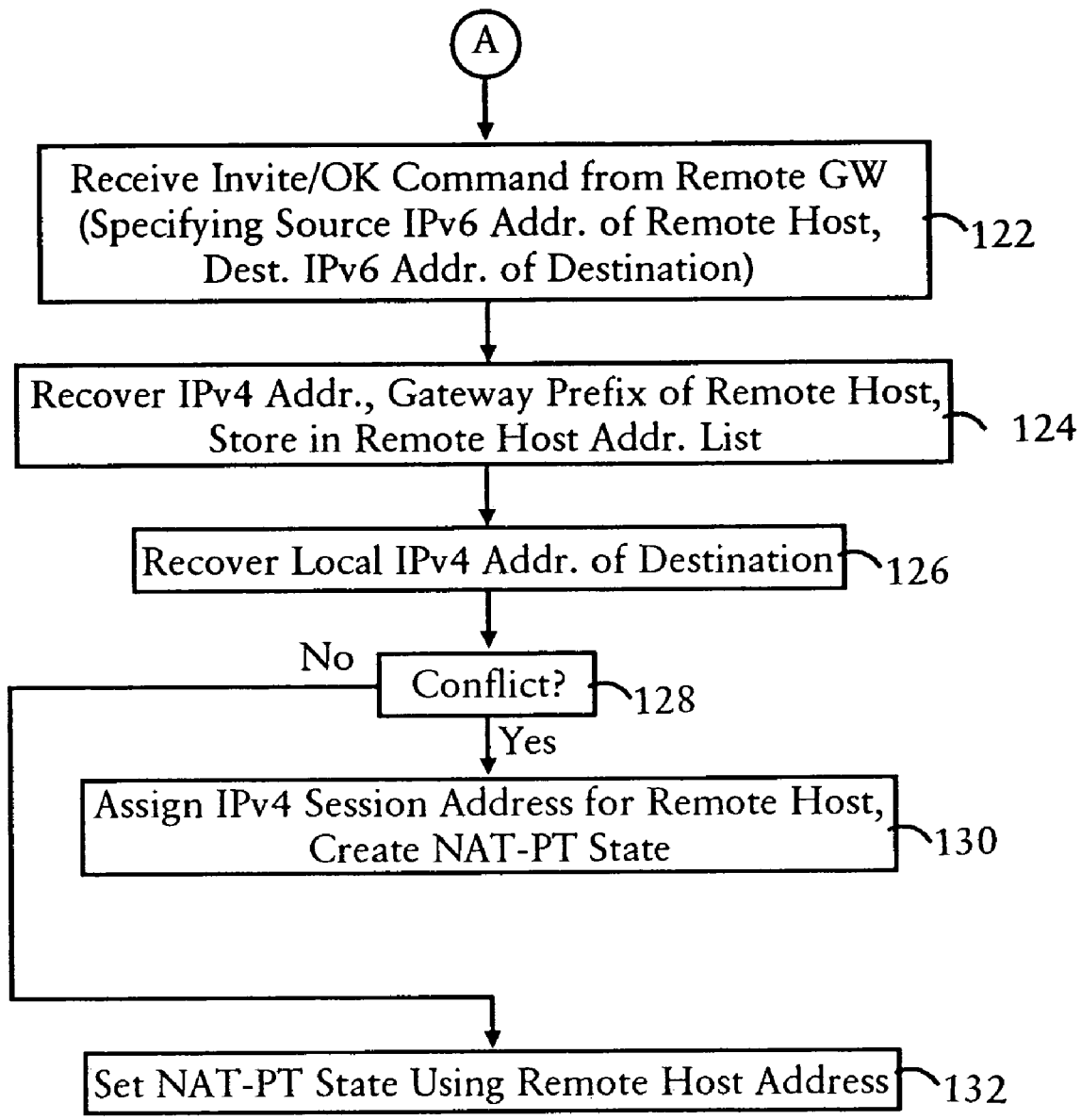
Figure 5A:
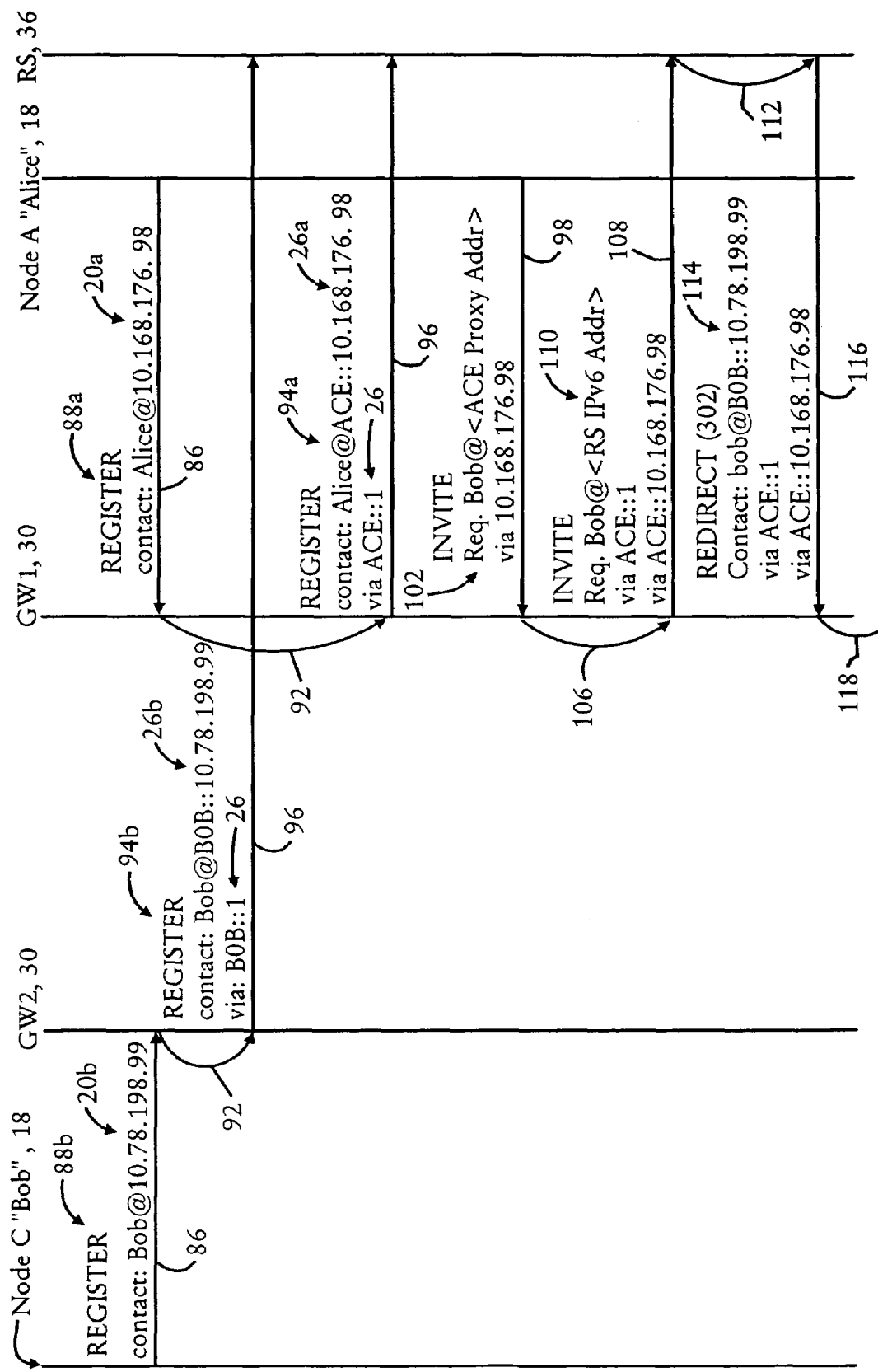
FIGS. 5A and 5B are diagrams summarizing in further detail the method of establishing Voice over IP communications between IPv4 hosts by the gateways of FIG. 1, according to an embodiment of the present invention.
Figure 5B:
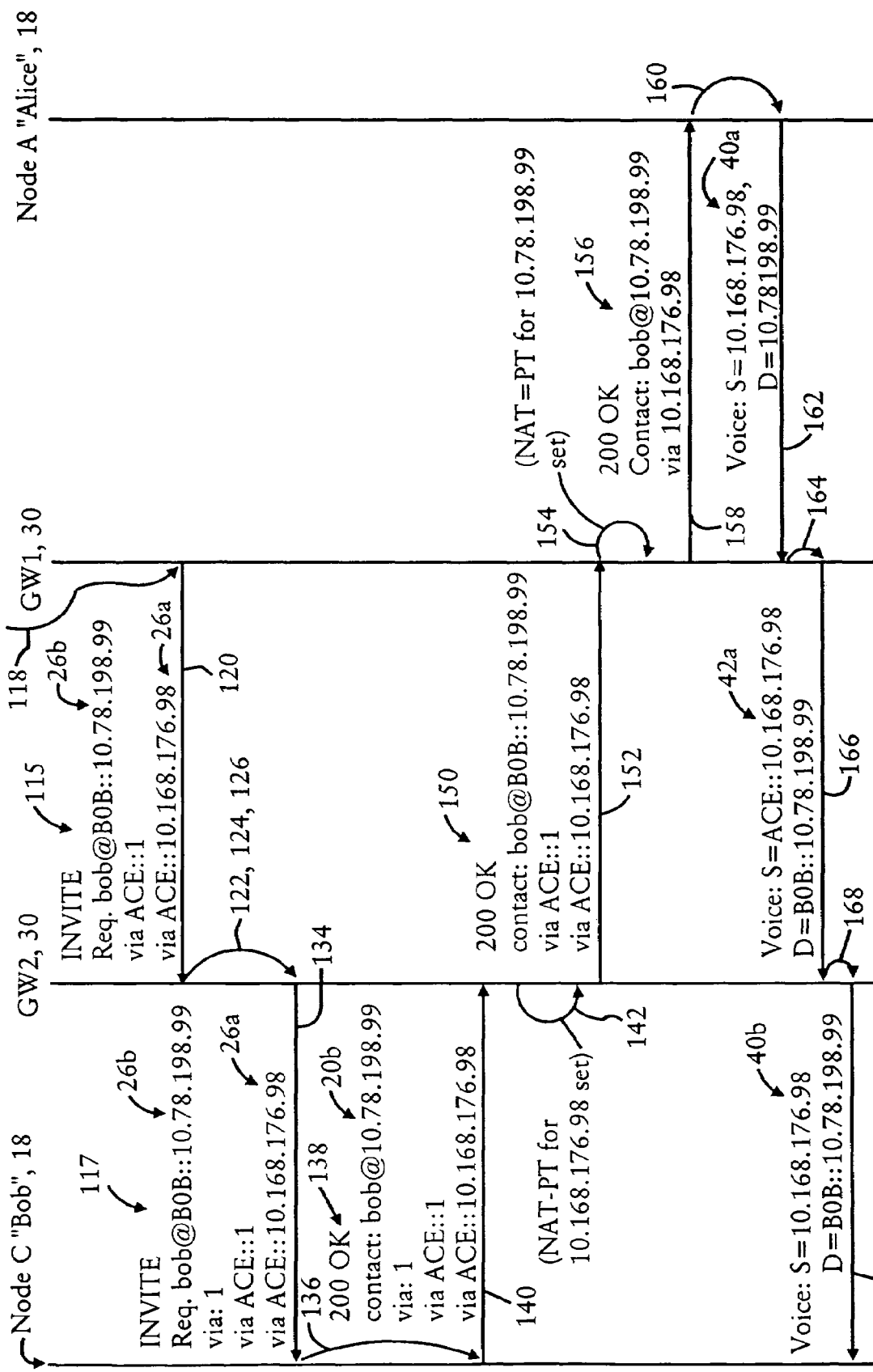

FIGS. 4A and 4B are diagrams summarizing the method of establishing communications between IPv4 hosts of distinct private networks by the gateways of FIG. 1, according to an embodiment of the present invention. FIGS. 5A and 5B are diagrams summarizing in further detail the method of establishing Voice over IP communications between IPv4 hosts by the gateways of FIG. 1, according to an embodiment of the present invention. The steps described below with respect to FIGS. 4 and 5 can be implemented in the gateways as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The following description will describe in general the operations of the gateways 30 using the steps of FIGS. 4A and 4B, with the specific example of voice over IP communications using the steps of FIGS. 5A and 5B.

The method begins in step 80, where the local DHCP resource 56 randomly assigns IPv4 addresses 20 to each of the local IPv4 hosts 18, and stores the assigned IPv4 addresses 20 in the DHCP client list, illustrated in FIG. 3. The local gateway 30 also sets in step 82 the NAT states 50 in order to identify the DHCP client list addresses as local addresses; in other words, NAT-PT entries 50a, 50c are initially created for the IPv4 hosts 18 having been assigned a private IPv4 address as specified in the DHCP client list. The NAT-PT resource 58 also reserves in step 84 a 96-bit subprefix from the assigned IPv6 prefix 34 in order to perform mapping of the IPv4 private addresses 20 to IPv6 addresses 26.

As illustrated in FIGS. 4A and 5A, assume in step 86 that the host IPv4 nodes "A" and "C" 18 each output to their corresponding gateway "GW1" and "GW2" a SIP-based Register command 88 for registration of the corresponding host IPv4 node "A" and "C" 18 with the redirect server 36. As illustrated in FIG. 5A, the Register commands 88a and 88b specify the respective private IPv4 addresses 20a and 20b of the IPv4 hosts "A" and "C" 18.

In response to the address resolution resource 60 determining in step 90 that the IPv4 packet is a Register command 88, the NAT-PT resource 58 maps in step 92 the host IPv4 address 20 to an IPv6 address 26. For example, the NAT-PT resource 58 in the private IPv4 network 12a maps in step 92 the private IPv4 address 20a in the IP headers to the IPv6 address 26a based on prepending the IPv4 address 20a with the IPv6 prefix "ACE::/96"; the application-level gateway 62 also maps in step 92 the private IPv4 address 20a in the payload of the IP packet (namely any references to the IPv4 address 20 following the IP header) to the IPv6 address 26a, resulting in the IPv6 packets 94a and 94b illustrated in FIG. 5A.

The redirect server 36 receives the IPv6-based register commands 94a and 94b via the IPv6 network 14, registers the IPv4 host names and the corresponding reachability information including the IPv6 based addresses 26, and optionally sends an acknowledgment back to the gateways 30 (not shown).

Assume now that the node "A" wishes to initiate communication with the node "C": the node "A" (Alice) 18 sends in step 98 of FIG. 5A an invite message 102 specifying the proxy address of the address resolution resource 60 in the local gateway 30. In response to the address resolution resource 60 detecting in step 100 the invite message 102, and assuming in step 104 there is no prior stored state 50 the destination device "C", the address resolution resource 60 causes the NAT-PT resource 58 to perform IPv4 to IPv6 translation, and causes the application-level gateway 62 to perform translation of the payload in step 106, followed by outputting the modified invite message 110 to the redirect server 36 in step 108.

The redirect server 36 generates a redirect response 114 in step 112 of FIG. 5A, and outputs the redirect response 114 to the gateway 30 in step 116. If in step 118 of FIG. 4A and FIGS. 5A, 5B detects the received message as a redirect response 114, the address resolution resource 60 of the gateway "GW1" having received the redirect response 114 sends in step 120 the redirected invite message 115 to the gateway "GW2" serving the private IPv4 network 12b.

In response to receiving in step 122 the invite message 115 by the remote gateway "GW2", the NAT-PT resource 58 in the remote gateway "GW2" creates in step 124 the NAT-PT state entry 50b specifying the IPv6 address 26a of node A, the IPv6 destination address 26b, and the recovered IPv4 destination address 20b from the IPv6 address 26b. The address resolution resource 60 also determines in step 128 if there are any IPv4 address conflicts: any conflicts cause the DHCP resource 56 to assign a temporary unique IPv4 private address in step 130, as illustrated as address 20d in FIG. 3; assuming in this example that there are no address conflicts in the private IPv4 network 12b, the NAT-PT resource 58 adds the recovered IPv4 address 20a to the NAT-PT state entry 50b.

The NAT-PT resource 58 and the ALG 62 translate the IPv6 addresses to IPv4 addresses as appropriate, and the IPv4 interface 50 outputs the modified Invite message 117 in step 134 of FIG. 5B. Assuming in step 136 that the host node "C" responds in step 136 by sending a message 138 in step 140 accepting the Invite, the NAT-PT resource 58 completes the NAT-PT state by setting the entry 50b as active and translating the IPv4 addresses into IPv6 addresses by the NAT-PT resource 58 and the ALG 62 in step 142, causing the modified acceptance message 150 to be output in step 152. Similar translation occurs in step 154 at the gateway "GW1", causing the message 150 to be modified into an IPv4 packet 156 for transmission in step 158 to the host node "A".

Subsequent communications are as described previously with respect to FIG. 6, where the node A generates in step 160 a packet 40a that is sent in step 162 via the private network 12a to the gateway "GW1"; the gateway "GW1" 30 modifies the packet 40a in step 164 based on the NAT-PT state 50a into the IPv6 packet 42a output onto the IPv6 network 14 in step 166. The remote gateway "GW2" translates the packet 42a into an IPv4 packet 40b in step 168 for transmission in step 170 to the destination IPv4 node "C" in the private network 12b.

According to the disclosed embodiment, communications can be dynamically established between IPv4 hosts in private IPv4 networks, without the necessity of encapsulation or tunneling. Hence, packet size and latency can be minimized, enabling Voice over IP communications to be implemented in private networks via an IPv6 access network.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a gateway coupled to a first private IPv4 network and an IPv6 network, the method including:

receiving by the gateway a first IPv4 packet from a first IPv4 node in the first private IPv4 network, the first IPv4 packet having a source address field specifying a first private IPv4 address having been dynamically assigned to the first IPv4 node, and a request for initiating a communication with a second IPv4 node identified in the request and outside the first private IPv4 network;

sending by the gateway the request into the IPv6 network for locating the second IPv4 node, including creating a first IPv6 address for the first IPv4 node based on prepending the first private IPv4 address with a prescribed IPv6 prefix assigned to the gateway;

obtaining by the gateway from the IPv6 network a response that specifies the first IPv6 address, and a second IPv6 address for reaching the second IPv4 node identified in the request via the IPv6 network;

creating by the gateway a network address translation-protocol translation (NAT-PT) state entry for enabling communication between the first IPv4 node and the second IPv4 node, the NAT-PT state entry specifying the first private IPv4 address for identifying the first IPv4 node in the first private IPv4 network, the first IPv6 address for identifying the first IPv4 node via the IPv6 network, the second IPv6 address for identifying the second IPv4 node via the IPv6 network, and a determined unique private IPv4 address for identifying the second IPv4 node within the first private IPv4 network; and establishing communications by the gateway between the first IPv4 node and the second IPv4 node via the first private IPv4 network and the IPv6 network, based on translation of the first private IPv4 address and the unique private IPv4 address specified in a data packet received from the first IPv4 node, into the respective first IPv6 address and the second IPv6 address for transmission of the data packet to the second IPv4 node via the IPv6 network as an IPv6 packet;

wherein the sending includes sending the request to a prescribed locator resource in the IPv6 network, the method further including:

receiving by the gateway a registration request from the first IPv4 node for registration in the prescribed locator resource;

modifying by the gateway the registration request to identify the first IPv4 node based on the first IPv6 address; and outputting by the gateway to the prescribed locator resource, via the IPv6 network, the registration request following the modifying, the registration request specifying a host name of the first IPv4 node and the first IPv6 address.

2. The method of claim 1, further comprising the gateway dynamically assigning each IPv4 node in the first IPv4 network with a corresponding private IPv4 address, including the first IPv4 node having been dynamically assigned with the first private IPv4 address, based on random selection of each corresponding private IPv4 address from within a prescribed private address space by a Dynamic Host Configuration Protocol (DHCP) resource within the gateway.

3. The method of claim 2, wherein:

the second IPv6 address specified in the response includes a second private IPv4 address used to identify the second IPv4 node within a second private IPv4 network reachable via the IPv6 network;

the creating includes selectively inserting the second private IPv4 address as the determined unique private IPv4 address, based on a determined absence of any conflict between the second private IPv4 address and the private IPv4 addresses having been assigned by the DHCP resource.

4. The method of claim 3, wherein the creating further includes dynamically creating, by the DHCP resource, the determined unique private IPv4 address based on a determined conflict between the second private IPv4 address and one of the private IPv4 addresses having been assigned by the DHCP resource.

5. The method of claim 4, wherein the establishing includes:

translating the first private IPv4 address and the unique private IPv4 address specified in an IP header of the data packet by a network address translation resource executed in the gateway; and translating the first private IPv4 address and the unique private IPv4 address specified in a payload of the data packet by an application level gateway executed in the gateway.

6. The method of claim 1, wherein the communications between the first IPv4 node and the second IPv4 node includes Voice over IP data packets.

7. The method of claim 1, wherein the prescribed locator resource is a Session Initiation Protocol (SIP) redirect server, and the registration request is a SIP Register command.

8. A network comprising:
an IPv6 network configured for routing IPv6 packets, the IPv6 network including a locator resource configured for identifying network nodes, having registered with the locator resource, by respective IPv6 addresses; and
a plurality of gateways configured for providing communications for respective private IPv4 networks to the IPv6 network, each gateway having a corresponding assigned IPv6 prefix and configured for dynamically assigning to each IPv4 node in the corresponding private IPv4 network a corresponding private IPv4 address within a prescribed IPv4 address domain;
each gateway comprising an address resource configured for determining the IPv6 address for a remote IPv4 node, located within a second one of the private IPv4 networks via a second one of the gateways, based on sending a query to the locator resource, the address resource including a network address translation-protocol translation (NAT-PT) resource configured for creating a NAT-PT state entry for enabling one of the IPv4 nodes in said each private IPv4 network to communicate with the remote IPv4 node via the IPv6 network, the NAT-PT resource adding within the NAT-PT state entry:
(a) the private IPv4 address assigned to the one IPv4 node in said each private IPv4 network,
(b) a generated IPv6 address having the corresponding assigned IPv6 address prefix prepended to the private IPv4 address assigned to the one IPv4 node and used for identification of the one IPv4 node via the IPv6 network,
(c) the IPv6 address for identifying the remote IPv4 node via the IPv6 network, and
(d) a determined unique private IPv4 address for identifying the remote IPv4 node within said each private IPv4 network;
wherein said each gateway and the second gateway are configured for establishing a communications between the one IPv4 node and the remote IPv4 node based on the second gateway creating a corresponding NAT-PT state entry specifying the IPv6 addresses of the one IPv4 node and the remote IPv4 node, and IPv4 addresses uniquely identifying the respective one IPv4 node and the remote IPv4 node within the second IPv4 private network.

9. The network of claim 8, wherein each gateway further includes a Dynamic Host Configuration Protocol (DHCP) resource configured for dynamically assigning each said IPv4 node in the corresponding private IPv4 network with the corresponding private IPv4 address based on random selection thereof within the prescribed IPv4 address domain.

10. The network of claim 9, wherein:
the IPv6 address of the remote IPv4 node includes the IPv6 prefix of the second gateway and the private IPv4 address having been assigned by the second gateway;
the NAT-PT resource in said each gateway is configured for selectively inserting the private IPv4 address having been assigned by the second gateway based on a determined absence of any conflict between the second private IPv4 address and the private IPv4 addresses having been assigned by the DHCP resource.

11. The network of claim 10, wherein the DHCP resource is configured for dynamically creating the determined unique private IPv4 address based on a determined conflict between the private IPv4 address having been assigned by the second gateway and one of the private IPv4 addresses having been assigned by the DHCP resource.

12. The network of claim 11, wherein in response to said each gateway receiving a data packet from the one IPv4 node and destined for the remote IPv4 node:
the NAT-PT resource is configured for translating, from with in an IP header of the data packet, the private IPv4 address assigned to the one IPv4 node and the determined unique private IPv4 address into the generated IPv6 address and the IPv6 address for the remote IPv4 node, respectively;
said each gateway further comprising an application level gateway configured for translating, from within a payload of the data packet, the private IPv4 address assigned to the one IPv4 node and the determined unique private IPv4 address into the generated IPv6 address and the IPv6 address for the remote IPv4 node, respectively.

13. The method of claim 12, wherein the communications between the one IPv4 node and the remote IPv4 node via said each gateway and the second gateway includes Voice over IP data packets.

14. The network of claim 8, wherein each gateway is configured for modifying a registration request from the one IPv4 node in the corresponding IPv4 network to identify the one IPv4 node based on the corresponding IPv6 address of the one IPv4 node, and outputting the registration request following modification to the prescribed locator resource via the IPv6 network, the registration request following modification specifying the host name of the one IPv4 node and the IPv6 address of the one IPv4 node.

15. The network of claim 14, wherein the locator resource is a Session Initiation Protocol (SIP) redirect server, and the registration request is a SIP Register command.

16. A gateway configured for providing communications for a first private IPv4 network to an IPv6 network, the gateway comprising:
an IPv4 interface configured for receiving a first IPv4 packet from a first IPv4 node in the private IPv4 network, the first IPv4 packet having a source address field specifying a first private IPv4 address having been dynamically assigned to the first IPv4 node, and a request for initiating a communication with a second IPv4 node identified in the request and outside the first private IPv4 network; and
an address resource configured for sending the request into the IPv6 network for locating the second IPv4 node, the address resource including a network address translation-protocol translation (NAT-PT) resource configured for creating a NAT-PT state entry for the first IPv4 node that specifies the first private IPv4 address and a first IPv6 address created for the first IPv4 node based on prepending the first private IPv4 address with a prescribed IPv6 prefix assigned to the gateway;
wherein the address resource is configured, in response to obtaining from the IPv6 network a response that specifies the first IPv6 address and a second IPv6 address for the second IPv4 node identified in the request, for adding to the NAT-PT state entry the second IPv6 address for identifying the second IPv4 node via the IPv6 network, and a determined unique private IPv4 address for identifying the second IPv4 node within the first private IPv4 network;

the address resource configured for establishing communications between the first IPv4 node and the second IPv4 node via the first private IPv4 network and the IPv6 network, based on translation of the first private IPv4 address and the unique private IPv4 address specified in a data packet received from the first IPv4 node, into the respective first IPv6 address and the second IPv6 address for transmission of the data packet to the second IPv4 node via the IPv6 network as an IPv6 packet;

wherein the address resource includes an address resolution resource configured for sending the request to a prescribed locator resource in the IPv6 network, wherein the address resource, in response to the IPv4 interface having received a registration request from the first IPv4 node for registration, is configured for modifying the registration request to identify the first IPv4 node based on the first IPv6 address, and outputting the registration request to the prescribed locator resource via the IPv6 network following modification of the registration request to specify the host name of the first IPv4 node and the first IPv6 address.

17. The gateway of claim 16, wherein the address resource includes a Dynamic Host Configuration Protocol (DHCP) resource configured for dynamically assigning each IPv4 node in the first IPv4 network with a corresponding private IPv4 address, including the first private IPv4 address for the first IPv4 node, based on random selection of each corresponding private IPv4 address from within a prescribed private address space.

18. The gateway of claim 17, wherein:
the second IPv6 address specified in the response includes a second private IPv4 address used to identify the second IPv4 node within a second private IPv4 network reachable via the IPv6 network;

the NAT-PT resource configured for selectively inserting the second private IPv4 address as the determined unique private IPv4 address, based on a determined absence of any conflict between the second private IPv4 address and the private IPv4 addresses having been assigned by the DHCP resource.

19. The gateway of claim 18, wherein the DHCP resource is configured for dynamically creating the determined unique private IPv4 address based on a determined conflict between the second private IPv4 address and one of the private IPv4 addresses having been assigned by the DHCP resource.

20. The gateway of claim 19, wherein the NAT-PT resource is configured for translating the first private IPv4 address and the unique private IPv4 address specified in an IP header of the data packet into the first IPv6 address and the second IPv6 address, respectively, the address resource further including an application level gateway configured for translating the first private IPv4 address and the unique private IPv4 address specified in a payload of the data packet into the first IPv6 address and the second IPv6 address, respectively.

21. The gateway of claim 16, wherein the communications between the first IPv4 node and the second IPv4 node includes Voice over IP data packets.

22. The gateway of claim 16, wherein the prescribed locator resource is a Session Initiation Protocol (SIP) redirect server, and the registration request is a SIP Register command.

23. A computer readable storage medium having stored thereon sequences of computer executable instructions for a gateway coupling a first private IPv4 network to an IPv6 network, the sequences of instructions including instructions for:

receiving by the gateway a first IPv4 packet from a first IPv4 node in the first private IPv4 network, the first IPv4 packet having a source address field specifying a first private IPv4 address having been dynamically assigned to the first IPv4 node, and a request for initiating a communication with a second IPv4 node identified in the request and outside the first private IPv4 network;

sending by the gateway the request into the IPv6 network for locating the second IPv4 node, including creating a first IPv6 address for the first IPv4 node based on prepending the first private IPv4 address with a prescribed IPv6 prefix assigned to the gateway;

obtaining by the gateway from the IPv6 network a response that specifies the first IPv6 address, and a second IPv6 address for reaching the second IPv4 node identified in the request via the IPv6 network;

creating by the gateway a network address translation-protocol translation (NAT-PT) state entry for enabling communication between the first IPv4 node and the second IPv4 node, the NAT-PT state entry specifying the first private IPv4 address for identifying the first IPv4 node in the first private IPv4 network, the first IPv6 address for identifying the first IPv4 node via the IPv6 network, the second IPv6 address for identifying the second IPv4 node via the IPv6 network, and a determined unique private IPv4 address for identifying the second IPv4 node within the first private IPv4 network; and establishing communications by the gateway between the first IPv4 node and the second IPv4 node via the first private IPv4 network and the IPv6 network, based on translation of the first private IPv4 address and the unique private IPv4 address specified in a data packet received from the first IPv4 node, into the respective first IPv6 address and the second IPv6 address for transmission of the data packet to the second IPv4 node via the IPv6 network as an IPv6 packet;

wherein the sending includes sending the request to a prescribed locator resource in the IPv6 network, the medium further including instructions for:

receiving by the gateway a registration request from the first IPv4 node for registration in the prescribed locator resource;

modifying by the gateway the registration request to identify the first IPv4 node based on the first IPv6 address; and outputting by the gateway to the prescribed locator resource, via the IPv6 network, the registration request following the modifying, the registration request specifying a host name of the first IPv4 node and the first IPv6 address.

24. The storage medium of claim 23, further comprising instructions for the gateway dynamically assigning each IPv4 node in the first IPv4 network with a corresponding private IPv4 address, including the first IPv4 node having been dynamically assigned with the first private IPv4 address, based on random selection of each corresponding private IPv4 address from within a prescribed private address space by a Dynamic Host Configuration Protocol (DHCP) resource within the gateway.

25. The storage medium of claim 24, wherein:

the second IPv6 address specified in the response includes a second private IPv4 address used to identify the second IPv4 node within a second private IPv4 network reachable via the IPv6 network;

the creating includes selectively inserting the second private IPv4 address as the determined unique private IPv4 address, based on a determined absence of any conflict between the second private IPv4 address and the private IPv4 addresses having been assigned by the DHCP resource.

26. The storage medium of claim 25, wherein the creating further includes dynamically creating, by the DHCP resource, the determined unique private IPv4 address based on a determined conflict between the second private IPv4 address and one of the private IPv4 addresses having been assigned by the DHCP resource.

27. The storage medium of claim 23, wherein the communications between the first IPv4 node and the second IPv4 node includes Voice over IP data packets.

28. The storage medium of claim 23, wherein the prescribed locator resource is a Session Initiation Protocol (SIP) redirect server, and the registration request is a SIP Register command.

29. A gateway coupled to a first private IPv4 network and an IPv6 network, the gateway comprising:

means for receiving a first IPv4 packet from a first IPv4 node in the first private IPv4 network, the first IPv4 packet having a source address field specifying a first private IPv4 address having been dynamically assigned to the first IPv4 node, and a request for initiating a communication with a second IPv4 node identified in the request and outside the first private IPv4 network; and means for sending the request into the IPv6 network for locating the second IPv4 node, including creating a first IPv6 address for the first IPv4 node based on prepending the first private IPv4 address with a prescribed IPv6 prefix assigned to the gateway;

the means for sending further configured for obtaining from the IPv6 network a response that specifies the first IPv6 address, and a second IPv6 address for reaching the second IPv4 node identified in the request via the IPv6 network;

the means for sending further configured for creating a network address translation-protocol translation (NAT-PT) state entry for enabling communication between the first IPv4 node and the second IPv4 node, the NAT-PT state entry specifying the first private IPv4 address for identifying the first IPv4 node in the first private IPv4 network, the first IPv6 address for identifying the first IPv4 node via the IPv6 network, the second IPv6 address for identifying the second IPv4 node via the IPv6 network, and a determined unique private IPv4 address for identifying the second IPv4 node within the first private IPv4 network;

the means for sending further configured for establishing communications between the first IPv4 node and the second IPv4 node via the first private IPv4 network and the IPv6 network, based on translation of the first private IPv4 address and the unique private IPv4 address specified in a data packet received from the first IPv4 node, into the respective first IPv6 address and the second IPv6 address for transmission of the data packet to the second IPv4 node via the IPv6 network as an IPv6 packet;

wherein the means for sending further is configured for:

sending the request to a prescribed locator resource in the IPv6 network, in response to the means for receiving having received a registration request from the first IPv4 node for registration in the prescribed locator resource, modifying the registration request to identify the first IPv4 node based on the first IPv6 address; and outputting to the prescribed locator resource, via the IPv6 network, the registration request specifying a host name of the first IPv4 node and the first IPv6 address.

30. The gateway of claim 29, wherein the means for sending further is configured for dynamically assigning each IPv4 node in the first IPv4 network with a corresponding private IPv4 address, including the first IPv4 node having been dynamically assigned with the first private IPv4 address, based on random selection of each corresponding private IPv4 address from within a prescribed private address space.

31. The gateway of claim 30, wherein:

the second IPv6 address specified in the response includes a second private IPv4 address used to identify the second IPv4 node within a second private IPv4 network reachable via the IPv6 network;

the means for sending further configured for selectively inserting the second private IPv4 address as the determined unique private IPv4 address, based on a determined absence of any conflict between the second private IPv4 address and the private IPv4 addresses having been assigned to each of the IPv4 nodes in the first IPv4 network.

32. The gateway of claim 31, wherein the means for sending further configured for dynamically creating the determined unique private IPv4 address based on a determined conflict between the second private IPv4 address and one of the private IPv4 addresses having been assigned to each of the IPv4 nodes in the first IPv4 network.

33. The gateway of claim 29, wherein the communications between the first IPv4 node and the second IPv4 node includes Voice over IP data packets.

34. The gateway of claim 29, wherein the prescribed locator resource is a Session Initiation Protocol (SIP) redirect server, and the registration request is a SIP Register command.

* * * * *